United States Patent
Noh (10) Patent No.: US 10,086,759 B2
(45) Date of Patent: Oct. 2, 2018

(54) VEHICLE DEPARTURE SUPPORT SYSTEM AND METHOD

(71) Applicant: MANDO CORPORATION, Pyeongtaek-si, Gyeonggi-do (KR)

(72) Inventor: Tae Bong Noh, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 275 days.

(21) Appl. No.: 15/087,505

(22) Filed: Mar. 31, 2016

(65) Prior Publication Data

US 2016/0288712 A1 Oct. 6, 2016

(30) Foreign Application Priority Data

Apr. 1, 2015 (KR) .................. 10-2015-0046161

(51) Int. Cl.
*B60R 1/00* (2006.01)
*G07C 5/02* (2006.01)
*B62D 15/02* (2006.01)
*G08G 1/16* (2006.01)
*G06F 19/00* (2018.01)

(52) U.S. Cl.
CPC ............. *B60R 1/00* (2013.01); *B62D 15/028* (2013.01); *B62D 15/0285* (2013.01); *G07C 5/02* (2013.01); *G08G 1/168* (2013.01); *B60R 2300/806* (2013.01); *B60R 2300/8093* (2013.01); *B60T 2201/10* (2013.01)

(58) Field of Classification Search
CPC ................ B60R 1/00; B60R 2300/806; B60R 2300/8093; B62D 15/028; B62D 15/0285; G07C 5/02; G08G 1/168; B60T 2201/10
USPC ..................................... 701/36, 70
See application file for complete search history.

(56) References Cited

U.S. PATENT DOCUMENTS

2009/0174574 A1* 7/2009 Endo .................. B60R 1/00
340/932.2

FOREIGN PATENT DOCUMENTS

KR 2013-0052856 A 5/2013

\* cited by examiner

*Primary Examiner* — Gertrude Arthur Jeanglaude
(74) *Attorney, Agent, or Firm* — Hauptman Ham, LLP

(57) ABSTRACT

A vehicle departure support system and method are provided. The vehicle departure support system supporting departure of a vehicle parked in a parking space, includes a speed measurement unit installed in the vehicle and configured to measure a speed of the vehicle, and a vehicle departure support device configured to display a vehicle departure mode on a screen installed in the vehicle based on whether there is movement of the vehicle in the parking space and a parking mode when the vehicle is parked in the parking space.

12 Claims, 8 Drawing Sheets

VEHICLE DEPARTURE SUPPORT SYSTEM AND METHOD

CROSS-REFERENCE TO RELATED APPLICATION

This application claims priority to and the benefit of Korean Patent Application No. 10-2015-0046161, filed on Apr. 1, 2015, the disclosure of which is incorporated herein by reference in its entirety.

BACKGROUND

1. Field of the Invention

The present invention relates to a vehicle departure support system, and more particularly, to a vehicle departure support system capable of easily selecting a vehicle departure mode a driver wants by displaying all vehicle departure modes on a screen when there is a movement of the vehicle for departure of the vehicle after parking of the vehicle is completed in a parking space.

2. Discussion of Related Art

Recently, a vehicle is being positioned as a necessity of modern people, a new vehicle is quickly being released and operated, and thus various social problems such as a traffic jam, a parking problem, etc. are being generated.

Particularly, the parking problem is very severe, parking spaces capable of being parked in are decreased as the number of vehicles is increased in a restricted region, city, or nation, and thus a parking stall divided so that one vehicle is able to park is gradually being narrowed in order to solve a shortage of parking spaces.

Further, when a plurality of vehicles park together in a parking space without a parking stall, an interval between the vehicles cannot help being narrow, and in this case, it is difficult for a driver to park a vehicle or perform departure of the vehicle from the parking space in a narrow parking space as the driver checks a peripheral obstacle with the naked eye and directly drives the vehicle.

In order to solve the problem, a vehicle departure support system is disclosed in various patent documents including Korean Patent Publication No. 2013-0052856.

A conventional vehicle departure support system including the patent compares state information of a previous vehicle and state information of a current vehicle when the parking of a vehicle is completed in a parking space in association with a parking steering support system, supports an automatic vehicle departure when the two states are identical according to the comparison result, and performs a simple vehicle departure guide when the two states are not identical.

Accordingly, the conventional vehicle departure support system supports the automatic vehicle departure when information on parking around the parking space is not changed only in a case of automatic parking, but does not provide a vehicle departure mode capable of performing the departure of the vehicle in the parking space in a case of manual parking and not automatic parking, and thus a selection of a driver is required in order to select one among four vehicle departure modes and inconvenience due to a malfunction, etc. occurs.

Further, when the departure of a vehicle is performed after parking of the vehicle is completed by automatic parking, the conventional vehicle departure support system simply informs the driver of a vehicle departure direction when state information of the vehicle when parking and state information when the vehicle departure is performed are not identical, and provides a warning and an alarm when there is a proximity obstacle in the vehicle departure direction, but there is an inconvenience of manipulation in which the driver should select the vehicle departure mode since the vehicle departure mode capable of automatically performing the departure of the vehicle is not provided even when there is a change in the peripheral environment after automatic parking is completed.

SUMMARY OF THE INVENTION

The present invention is directed to a vehicle departure support system in which a vehicle departure mode is easily selectable by a driver by displaying all vehicle departure modes on a screen when there is a movement of a vehicle for departure of the vehicle in the parking space after parking of the vehicle is completed in the parking space.

According to one aspect of the present invention, there is provided a vehicle departure support system for supporting a departure of a vehicle parked in a parking space, including: a speed measurement unit installed in the vehicle and configured to measure a speed of the vehicle; and a vehicle departure support device configured to display a vehicle departure mode on a screen installed in the vehicle based on whether there is movement of the vehicle in the parking space and a parking mode when parking in the parking space.

The vehicle departure support device may include: a storage unit configured to store an on signal and an off signal of an automatic parking switch included in the vehicle when the vehicle is parked in the parking space, and the parking mode at a time at which parking is completed during automatic parking; a determination unit configured to compare the speed of the vehicle received from the speed measurement unit or a moving distance of the vehicle calculated based on the speed of the vehicle and a predetermined reference speed when a departure of the vehicle is performed, and determine whether there is movement of the vehicle in the parking space; a vehicle departure mode determination unit configured to determine the vehicle departure mode in the parking space based on the determination result of the determination unit; and a vehicle departure mode display processor unit configured to display the vehicle departure mode determined by the vehicle departure mode determination unit on the screen.

When the determination unit determines that there is no movement of the vehicle in the parking space, the vehicle departure mode determination unit may determine a vehicle departure mode corresponding to the parking mode stored in the storage unit as the vehicle departure mode capable of performing the departure of the vehicle in the parking space, and when the determination unit determines that there is movement of the vehicle in the parking space, the vehicle departure mode determination unit may determine a vehicle departure mode recommended among all vehicle departure modes based on a distance to an obstacle positioned around the vehicle.

The determination unit may determine whether a switch signal of the automatic parking switch stored in the storage unit is the on signal or the off signal, and when the determination unit determines that the switch signal of the automatic parking switch is the off signal, the vehicle departure mode determination unit may determine the vehicle departure mode recommended in the parking space based on a distance to an obstacle positioned around the vehicle among all vehicle departure modes.

The determination unit may determine whether a switch signal of the automatic parking switch stored in the storage unit is the on signal or the off signal, and when the determination unit determines that the switch signal of the automatic parking switch is the on signal and there is no movement of the vehicle when the departure of the vehicle is performed, the vehicle departure mode display processor may display both a vehicle departure mode corresponding to the parking mode stored in the storage unit and a selection button capable of selecting another vehicle departure mode on one screen.

The determination unit may determine whether a switch signal of the automatic parking switch stored in the storage unit is the on signal or the off signal, and when the determination unit determines that the switch signal of the automatic parking switch is the on signal and there is the movement of the vehicle when the departure of the vehicle is performed, the vehicle departure mode display processor may display a vehicle departure mode recommended among all vehicle departure modes by differentiating the recommended vehicle departure mode from the other vehicle departure modes on one screen when displaying all of the vehicle departure modes on the one screen.

The determination unit may determine whether a switch signal of the automatic parking switch stored in the storage unit is the on signal or the off signal, and when the determination unit determines that the switch signal of the automatic parking switch is the off signal, the vehicle departure mode display processor may display a vehicle departure mode recommended among all vehicle departure modes by differentiating the recommended vehicle departure mode from the other vehicle departure modes on one screen when displaying all of the vehicle departure modes on the one screen.

The vehicle departure support system may further include: a distance measurement unit installed in the vehicle, and configured to measure a distance to an obstacle positioned around the vehicle, wherein the vehicle departure mode determination unit may determine a recommended vehicle departure mode using a vehicle departure type determined according to whether an obstacle is at a front and rear or a left and right of the vehicle based on the distance measured by the distance measurement unit and a parking direction determined according to whether an obstacle is in a direction which a vehicle departure of the vehicle using the determined vehicle departure type is performed.

According to another aspect of the present invention, there is provided a vehicle departure support method for supporting a departure of a vehicle parked in a parking space, including: receiving an ignition on signal of the vehicle; determining whether a parking method of the vehicle is an automatic parking method or a manual parking method; and determining a vehicle departure mode based on the parking method when parking the vehicle.

The vehicle departure support method may further include, when the parking method of the vehicle is the automatic parking method when parking the vehicle, determining whether there is movement of the vehicle between the determining of whether the parking method of the vehicle is the automatic parking method or the manual parking method and the determining of the vehicle departure mode.

When it is determined that there is no movement of the vehicle, the determining of the vehicle departure mode may include: determining a vehicle departure mode corresponding to a parking mode when parking the vehicle; and displaying both the determined vehicle departure mode and a selection button capable of selecting another vehicle departure mode on one screen.

When it is determined that there is movement of the vehicle, the determining of the vehicle departure mode may include: determining a vehicle departure mode recommended among all vehicle departure modes based on a distance to an obstacle positioned around the vehicle; displaying the recommended vehicle departure mode by differentiating the recommended vehicle departure mode from the other vehicle departure modes on one screen; and supporting the vehicle departure of the vehicle of a vehicle departure mode selected in the displayed screen.

When the parking method is the manual method when parking the vehicle, the determining of the vehicle departure mode may include: determining a vehicle departure mode recommended among all vehicle departure modes based on a distance to an obstacle positioned around the vehicle; displaying the recommended vehicle departure mode by differentiating the recommended vehicle departure mode from the other vehicle departure modes on one screen; and supporting the vehicle departure of the vehicle of a vehicle departure mode selected in the displayed screen.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings.

Figure 1:
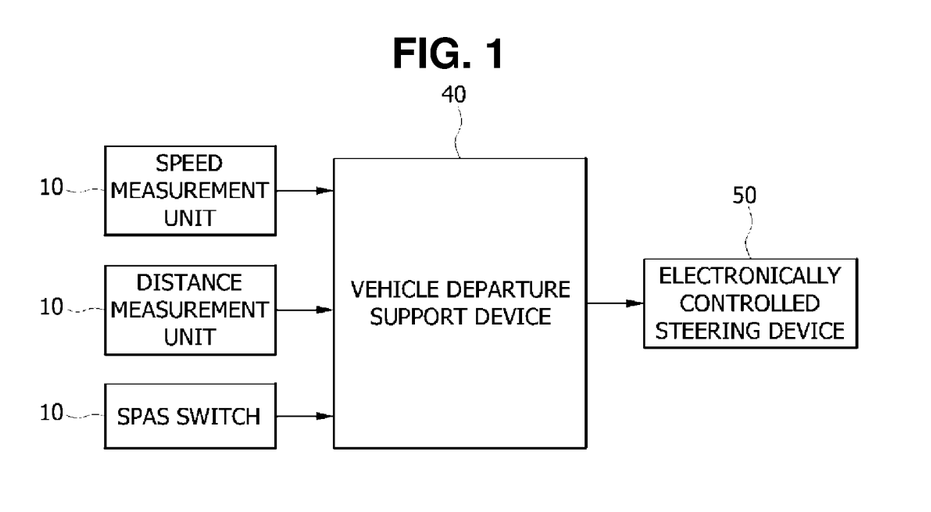
FIG. 1 is a block diagram illustrating a vehicle departure support system according to an embodiment of the present invention.
Figure 2:
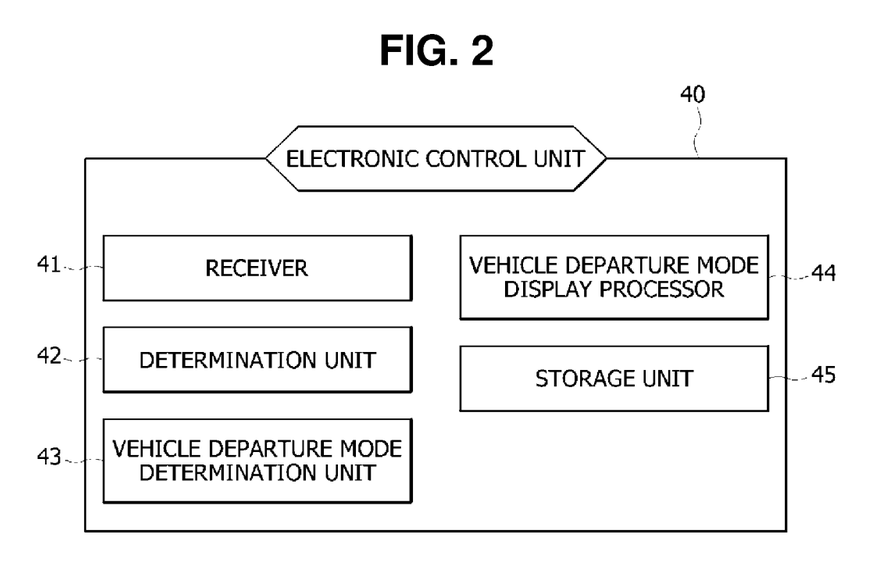
FIG. 2 is a block diagram illustrating a vehicle departure support device shown in FIG. 1.

FIG. 1 is a block diagram illustrating a vehicle departure support system according to an embodiment of the present invention, and FIG. 2 is a block diagram illustrating a vehicle departure support device shown in FIG. 1.

Referring to FIG. 1, a vehicle departure support system according to an embodiment of the present invention may include a speed measurement unit 10 measuring a speed of a vehicle, a distance measurement unit 20 measuring a distance to an obstacle positioned around a vehicle, a smart parking assist system (SPAS) switch 30, and a vehicle departure support device 40 supporting departure of a vehicle parked in a parking space. Here, an example in which the vehicle departure support device 40 is separately included is described, but the vehicle departure support device 40 may be implemented to be included in a SPAS.

The speed measurement unit 10 may be a sensor measuring a vehicle speed or a wheel speed of a vehicle, and may be a vehicle speed sensor, or a wheel speed sensor. The vehicle speed sensor or the wheel speed sensor may be connected to the vehicle departure support device 40 through an interface, for example, a local interconnect network (LIN).

The distance measurement unit 12 may measure a distance to an obstacle positioned in the front and rear of the vehicle positioned in the parking space. The distance measurement unit 12 may be a sensor capable of measuring the distance to the object positioned in the front and rear of the vehicle, and may be an ultrasonic sensor.

Further, the distance measurement unit 12 may be two or more side sensors installed in sides of a vehicle C shown in FIGS. 6 to 11, and two or more front and rear sensors installed in the front and rear of the vehicle C. The side sensors and the front and rear sensors may be connected to the vehicle departure support device 40 through an interface, for example, the LIN.

The SPAS switch 30 may be installed in the vehicle, and be switched by an on signal for instructing automatic parking or an off signal for stopping automatic parking. When the SPAS switch 30 (hereinafter, referred to as an "automatic parking switch") is pushed by a driver in a state set by the off signal, the on signal for instructing automatic parking may be transmitted to an electronic control unit of the SPAS.

The vehicle departure support device 40 may support a vehicle departure guide through a speaker, a screen of a terminal installed in the vehicle, or a combination thereof.

The vehicle departure support device 40 may be connected to an electronically controlled steering device 50 for supporting steering in a vehicle departure direction. The electronically controlled steering device 50 may control a steering angle according to a steering control signal provided from the vehicle departure support device 40.

The vehicle departure support device 40 according to an embodiment of the present invention may store a parking mode determined at a time at which the parking is completed together with the on signal of the automatic parking switch 30 during automatic parking, determine and display whether the vehicle moves when the departure of the vehicle is performed in the parking space and the vehicle departure mode provided on the screen according to the on signal or the off signal, and thus allow the driver to select the vehicle departure mode easily and perform the departure of the vehicle in the parking space quickly.

Referring to FIG. 2, the vehicle departure support device 40 may include a receiver 41, a determination unit 42, a vehicle departure mode determination unit 43, a vehicle departure mode display processor 44, and a storage unit 45.

The storage unit 45 may store the parking mode determined at a time at which parking is completed in the parking space.

The receiver 41 may receive an ignition on signal of the vehicle.

Also, the receiver 41 may receive the speed of the vehicle measured by the speed measurement unit 10 measuring the speed of the vehicle.

Further, the receiver 41 may receive the distance measured by the distance measurement unit 20 measuring the distance to the obstacle positioned around the vehicle.

Moreover, the receiver 41 may receive the on signal from the automatic parking switch 30 installed in the vehicle. The on signal received from the automatic parking switch 30 may be temporarily stored in the storage unit 45.

The determination unit 42 may compare the received speed of the vehicle and a predetermined reference speed, and determine whether the vehicle moves in the parking space. In detail, the determination unit 42 may determine that there is movement of the vehicle in the parking space when the speed of the vehicle measured by the vehicle speed sensor exceeds the predetermined reference speed or a driving distance calculated using a pulse measured by the wheel speed sensor and the rolling radius of a wheel exceeds a predetermined reference driving distance.

Further, the determination unit 42 may determine whether a parking method is automatic parking or manual parking when parking in the parking space. Whether a parking method is automatic parking or manual parking may be determined according to whether the on signal is received, and the determination unit 42 may determine that the parking method is automatic parking when the on signal is received, and the parking method is manual parking when the on signal is not received.

The vehicle departure mode determination unit 43 may determine a vehicle departure mode, for example, a backward perpendicular vehicle departure mode, corresponding to the parking mode, for example, a forward perpendicular parking mode, stored in the storage unit 45 when the parking method is automatic parking and there is no movement of the vehicle according to the determination result of the determination unit 42.

Further, the vehicle departure mode determination unit 43 may determine a vehicle departure mode recommended from all vehicle departure modes, that is, a forward perpendicular vehicle departure mode, the backward perpendicular vehicle departure mode, a left parallel vehicle departure mode, and a right parallel vehicle departure mode, based on the distance to the obstacle positioned around the vehicle received through the receiver 41 when the parking method is automatic parking but there is movement of the vehicle according to the determination result of the determination unit 42.

Moreover, the vehicle departure mode determination unit 43 may firstly determine a vehicle departure type as a perpendicular vehicle departure when obstacles positioned at the left or the right of the vehicle are sensed among the distances to the obstacles positioned around the vehicle received through the receiver 41, secondarily determine a direction in which there is no obstacle in the front and the rear of the vehicle as a vehicle departure direction, and finally determine a recommended vehicle departure mode.

Further, the vehicle departure mode determination unit 43 may firstly determine the vehicle departure type as a parallel vehicle departure when an obstacle positioned at the front or the rear of the vehicle is sensed among the distances to the obstacles positioned around the vehicle received through the receiver 41, secondarily determine a direction in which there is no obstacle at the left and the right of the vehicle as the vehicle departure direction, and finally determine a recommended vehicle departure mode.

Moreover, the vehicle departure determination unit 43 may determine the vehicle departure mode as the forward perpendicular vehicle departure mode by giving a priority to the front of the vehicle for convenience of the driver when the vehicle departure type is determined as the perpendicular vehicle departure and there is no obstacle at both the front and the rear of the vehicle, and give the priority by considering a driving direction of each nation when the parking-out type is determined as a parallel vehicle departure and there is no obstacle at both the left and the right of the vehicle. For example, in a road environment of driving on the right, when the vehicle departure type may be determined as the parallel vehicle departure, and there is no obstacle at both the left and the right of the vehicle, the recommended vehicle departure mode may be determined as the left parallel vehicle departure mode by considering that the vehicle has to be driven on the right.

The vehicle departure mode display processor 44 may display the vehicle departure mode determined by the vehicle departure mode determination unit 43 on the screen.

Figure 4:
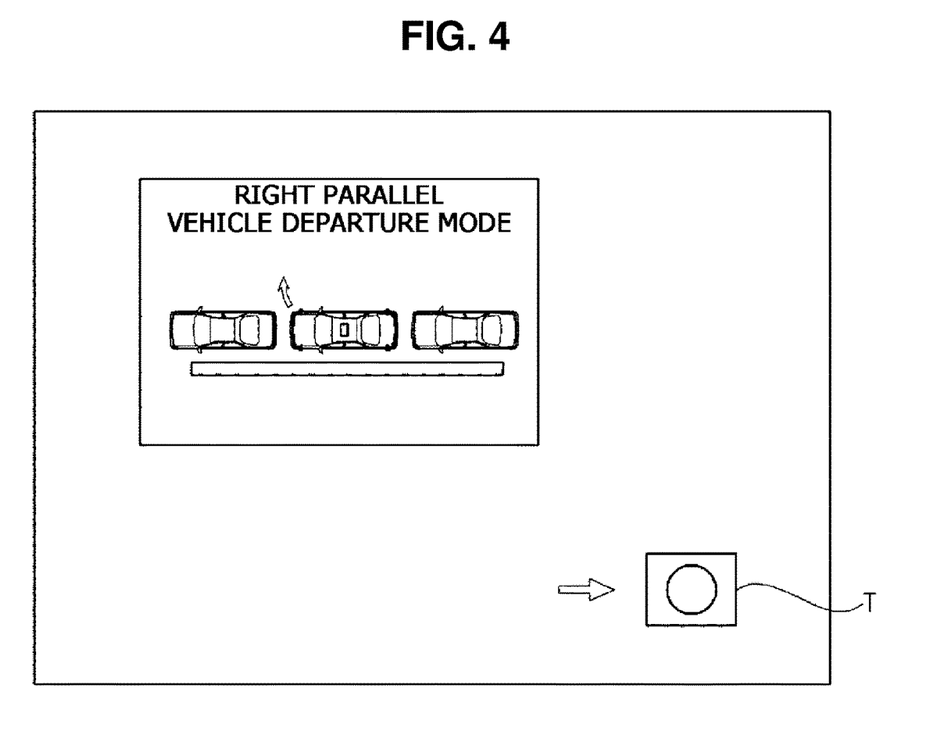
FIG. 4 is an example of a screen displaying a vehicle departure mode provided when there is no movement of a vehicle during automatic parking.

The vehicle departure mode display processor 44 may display both one vehicle departure mode corresponding to the parking mode stored in the storage unit 45 and a selection button T capable of selecting another vehicle departure mode on one screen at a time at which automatic parking is completed as shown in FIG. 4 when the parking method is an automatic method and the vehicle departure mode corresponding to the parking mode stored in the storage unit 45 is determined.

Figure 5:
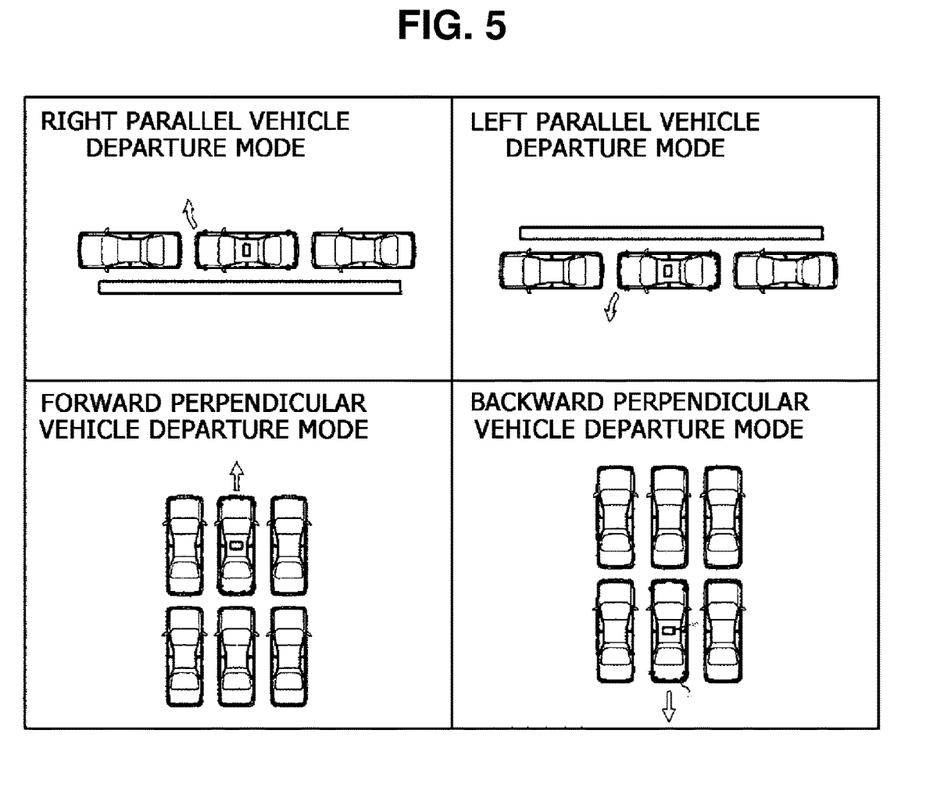
FIG. 5 is an example showing all vehicle departure modes provided when there is movement of a vehicle during automatic parking, or when manual parking.

Further, the vehicle departure mode display processor 44 may display all of the vehicle departure modes (a total four vehicle departure modes including the forward perpendicular vehicle departure mode, the backward perpendicular vehicle departure mode, the left parallel vehicle departure mode, and the right parallel vehicle departure mode) which are predefined on one screen when the parking method is automatic parking but the recommended vehicle departure mode is determined, but display the recommended vehicle departure mode by differentiating it from the other vehicle departure modes. Accordingly, since the driver easily recognizes whether to select any vehicle departure mode among all of the entire vehicle departure modes, the driver may be prevented from selecting an erroneous vehicle departure mode.

A vehicle departure support method of the vehicle departure support system having the above configuration will be described below with reference to FIG. 3.

Figure 3:
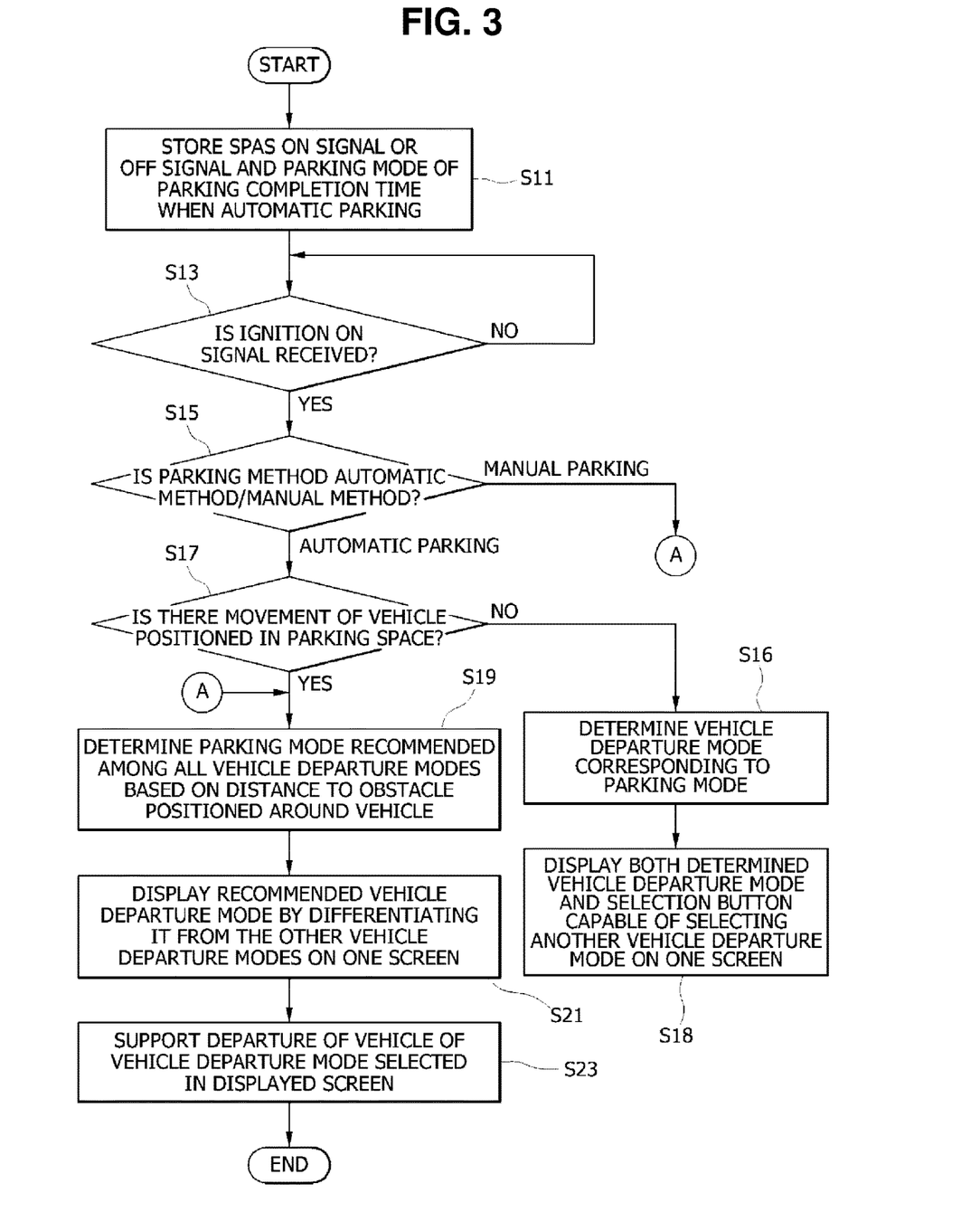
FIG. 3 is a flowchart for describing a vehicle departure support method of a vehicle departure support system according to an embodiment of the present invention.

FIG. 3 is a flowchart for describing a vehicle departure support method of a vehicle departure support system according to an embodiment of the present invention.

Referring to FIG. 3, the vehicle departure support device 40 may store the SPAS on signal or off signal of the automatic parking switch 30 when parking in a parking space and a parking mode determined at the time at which parking is completed when automatic parking in the storage unit 45, (S11).

For the departure of the vehicle in the parking space, the vehicle departure support device 40 may determine whether the ignition on signal of a vehicle is received (S13).

When the ignition on signal of the vehicle is not received based on the determination result of operation S13, the vehicle departure support device 40 may maintain a standby state for a predetermined time.

When the ignition on signal of the vehicle is received based on the determination result of operation S13, the vehicle departure support device 40 may determine whether a parking method was automatic parking or manual parking (S15). Whether the parking method was automatic parking or manual parking may be determined by whether the on signal of the automatic parking switch 30 is stored in the storage unit 45.

When the parking method is determined as manual parking based on the determination result of operation S15, the vehicle departure support device 40 may determine a vehicle departure mode recommended among all of the vehicle departure modes by proceeding to operation S19 which will be described below.

When the parking method is determined as automatic parking based on the determination result of operation S15, the vehicle departure support device 40 may determine whether the vehicle positioned in the parking space moves (S17). In this case, whether the vehicle positioned in the parking space moves may be determined that there is movement of the vehicle positioned in the parking space when a speed of the vehicle measured by the speed measurement unit 10 is received after operation S13 described above and exceeds the predetermined reference speed, and be determined that there is no movement of the vehicle positioned in the parking space when the speed of the vehicle does not exceed the predetermined reference speed. When a moving distance calculated using a wheel speed and the rolling radius of the wheel by receiving the wheel speed of the vehicle as well as the speed of the vehicle exceeds the predetermined reference distance, it may also be determined that there is movement of the vehicle in the parking space.

When there is no movement of the vehicle positioned in the parking space based on the determination result of operation S17, the vehicle departure support device 40 may determine the vehicle departure mode corresponding to the parking mode stored in the storage unit 45 (S16).

The vehicle departure support device 40 may display both the vehicle departure mode corresponding to the parking mode and the selection button capable of selecting another vehicle departure mode on one screen (S18).

When there is movement of the vehicle positioned in the parking space based on the determination result of the operation S17, the vehicle departure support device 40 may determine the vehicle departure type according to whether an obstacle is at the front and rear or the left and right of the vehicle based on a distance measured by the distance measurement unit 20, determine a vehicle departure direction according to whether an obstacle is in a direction in which the vehicle departure of the vehicle using the determined vehicle departure type will be performed, and finally determine the recommended vehicle departure mode (S19).

Figure 6:
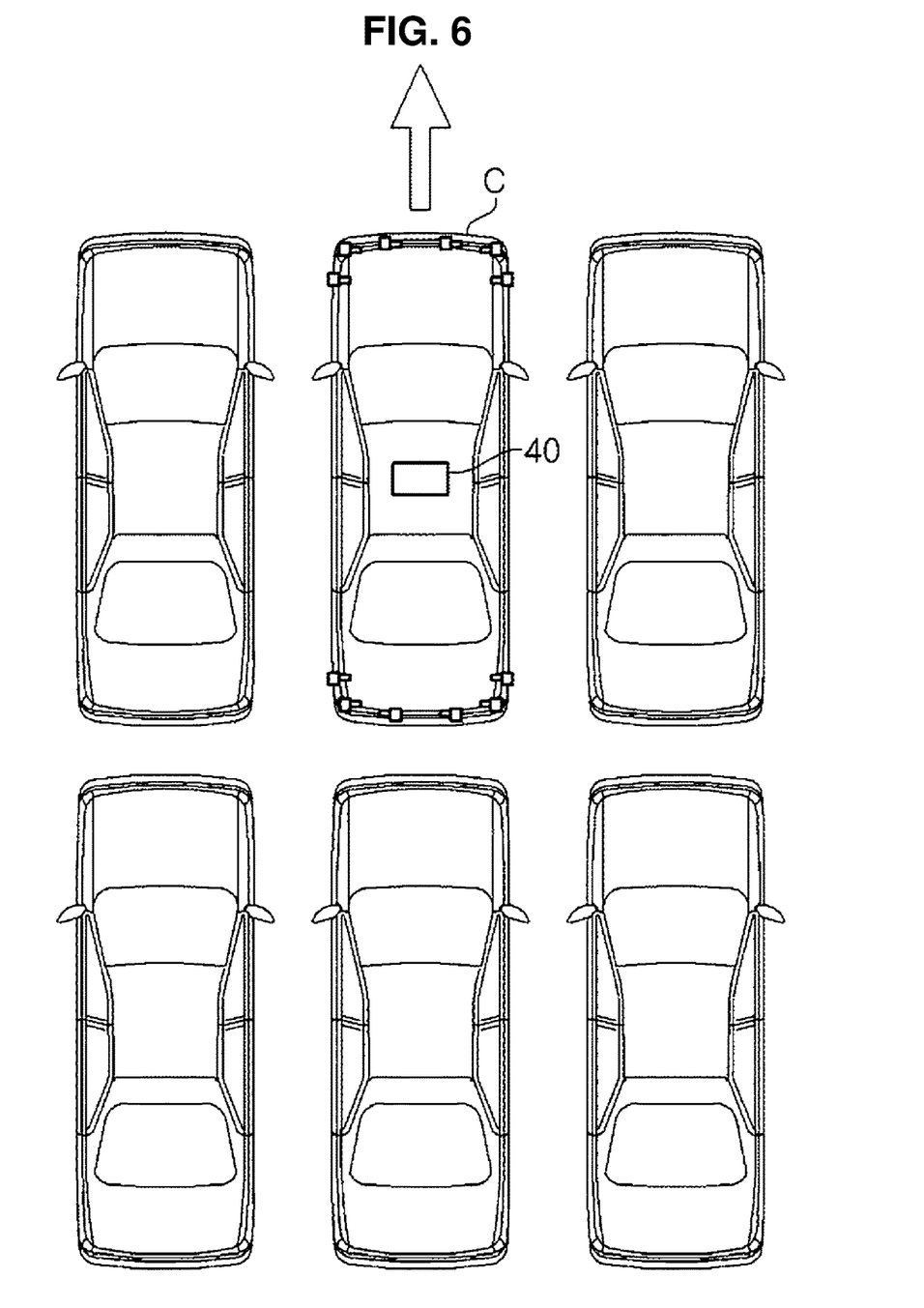
FIG. 6 is an example of a screen showing a forward perpendicular vehicle departure environment.

Referring to FIG. 6, the vehicle departure support device 40 may determine the vehicle departure type as the perpendicular vehicle departure when a vehicle departure of the vehicle C in the parking space is performed and an obstacle is sensed at the left and right of the vehicle C, may determine the vehicle departure direction as the front direction when an obstacle is not sensed at the front of the vehicle C and is sensed at the rear of the vehicle C, and finally determine the recommended vehicle departure mode as the forward perpendicular vehicle departure mode.

Figure 7:
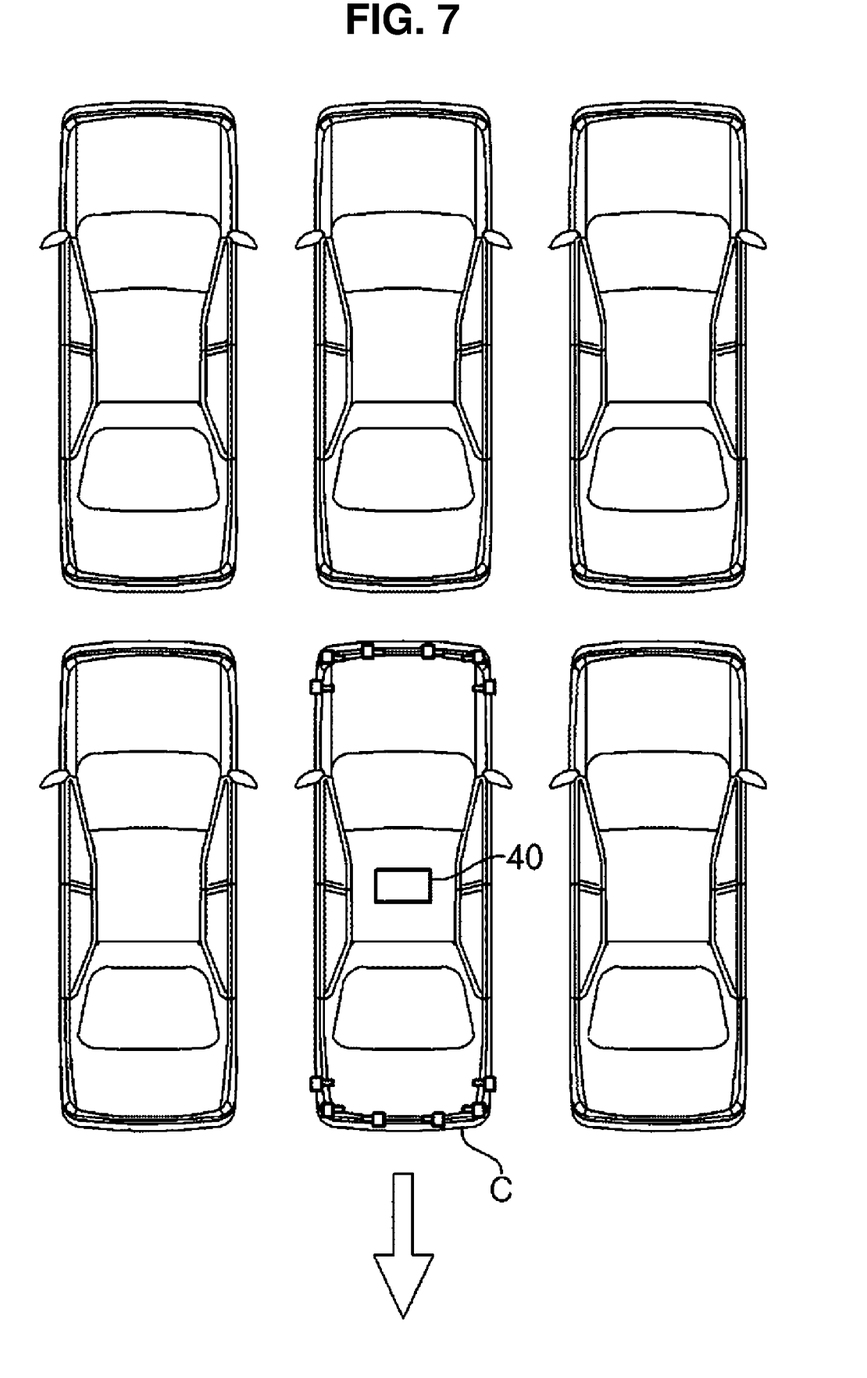
FIG. 7 an example of a screen showing a backward perpendicular vehicle departure environment.

Referring to FIG. 7, the vehicle departure support device 40 may determine the vehicle departure type as a perpendicular vehicle departure when the departure of the vehicle C is performed in the parking space and an obstacle is sensed at the left and right of the vehicle C, determine the vehicle departure direction as the rear direction when the obstacle is sensed at the front of the vehicle C and is not sensed at the rear of the vehicle C, and finally determine the recommended vehicle departure mode as the backward perpendicular vehicle departure mode.

Figure 8:
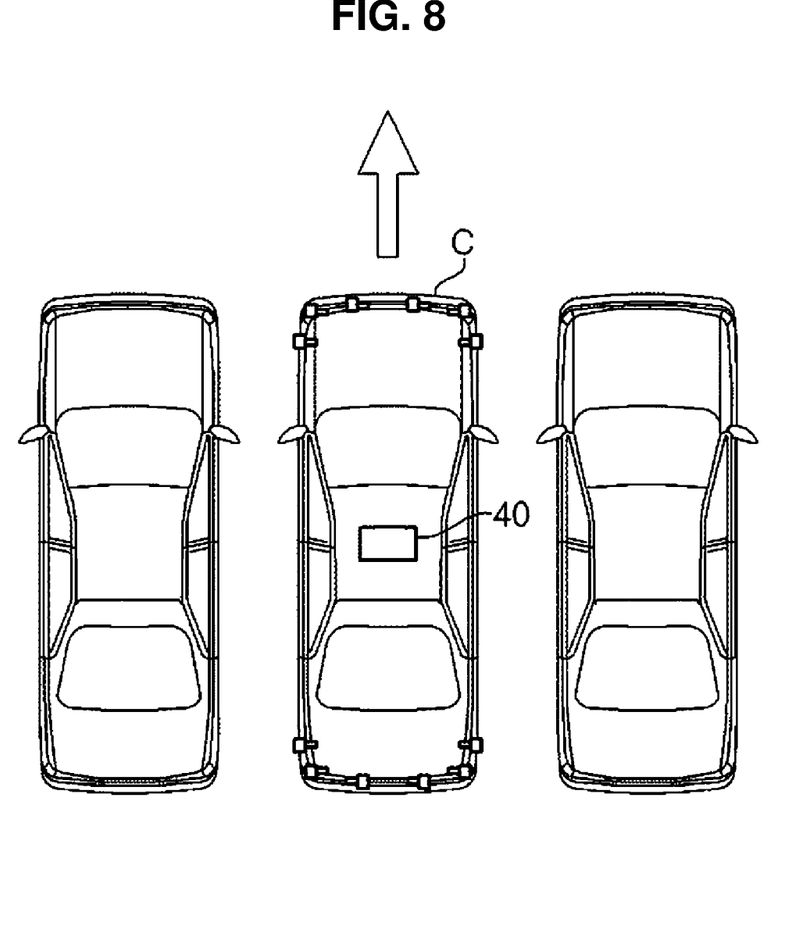
FIG. 8 is an example of a screen showing a vehicle departure mode recommended in an environment in which there is no obstacle in the front and rear of a vehicle.

As shown in FIG. 8, the vehicle departure support device 40 may determine the vehicle departure type as a perpendicular vehicle departure when an obstacles are sensed at the left and right of the vehicle C, but when an obstacle is not sensed at both the front and the rear of the vehicle C, display by giving a higher priority to the front side than the rear side of the vehicle by considering the convenience of the driver, and finally determine the recommended vehicle departure mode as the forward perpendicular vehicle departure mode.

Figure 9:
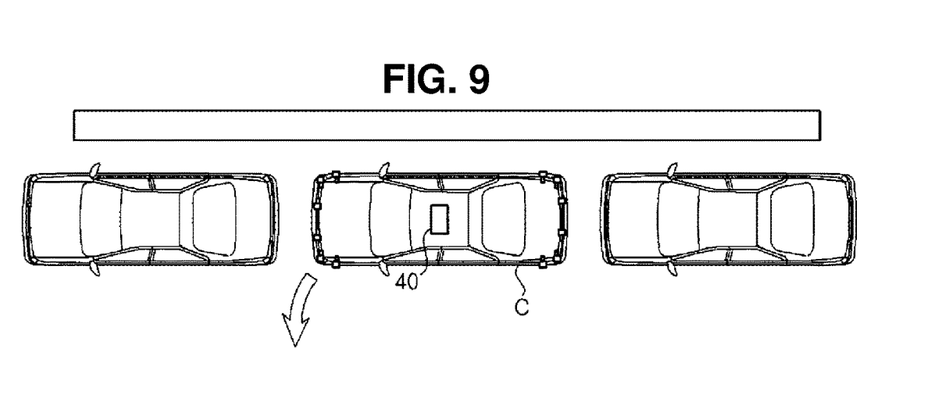
FIG. 9 is an example of a screen showing a left parallel vehicle departure environment.

Referring to FIG. 9, the vehicle departure support device 40 may determine the vehicle departure type as a parallel vehicle departure when the vehicle departure of the vehicle C is performed in the parking space and obstacles are sensed at the front and rear of the vehicle C, determine the vehicle departure direction as the left direction when an obstacle is sensed at the right of vehicle C and is not sensed at the left of the vehicle C, and finally determine the recommended vehicle departure mode as the left parallel vehicle departure mode.

Figure 10:
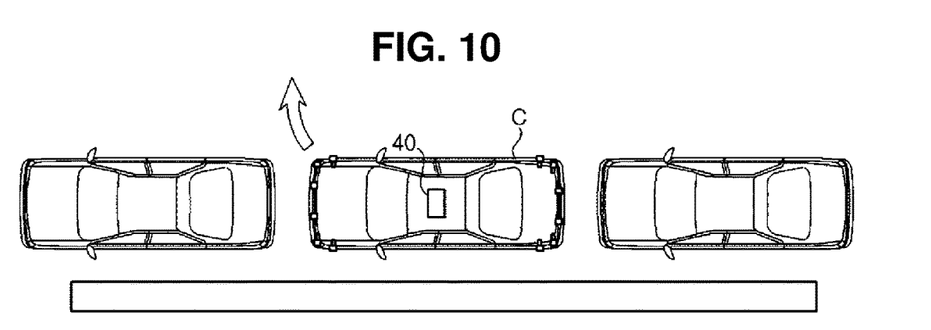
FIG. 10 is an example of a screen showing a right parallel vehicle departure environment.

Referring to FIG. 10, the vehicle departure support device 40 may determine the vehicle departure type as a parallel vehicle departure when the vehicle departure of the vehicle C is performed in the parking space and obstacles are sensed at the front and rear sides of the vehicle C, determine the vehicle departure direction as the right direction when an obstacle is not sensed at the right of the vehicle C and is sensed at the left of the vehicle C, and finally determine the recommended vehicle departure mode as the right parallel vehicle departure mode.

Figure 11:
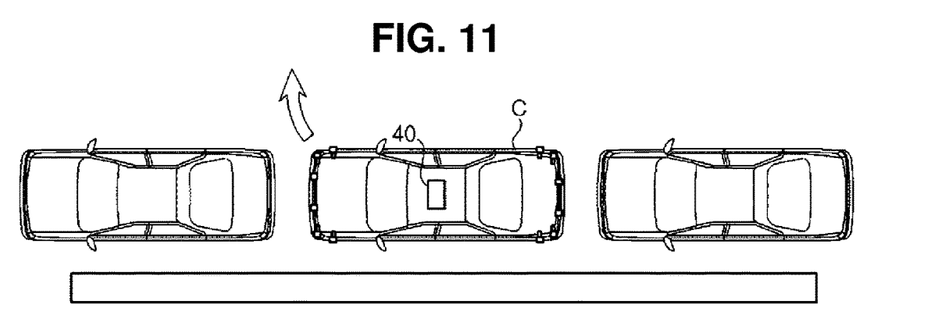
FIG. 11 is an example of a screen showing a vehicle departure mode recommended in a road environment of driving on the right.

As shown in FIG. 11, the vehicle departure support device 40 may determine the vehicle departure type as a parallel vehicle departure when obstacles are sensed at the front and rear sides of the vehicle C, but when an obstacle is not sensed at both the left and the right of the vehicle C, finally determine the recommended vehicle departure mode as the left parallel vehicle departure mode so as to be advantageous to the driving on the right by giving a higher priority to the right side than the left side in a road environment of driving on the right when an obstacle is not sensed at the left and right sides of the vehicle C.

The vehicle departure support device 40 may provide all of the vehicle departure modes which are predefined on the screen, but display the recommended vehicle departure mode on the screen by differentiating it from the other vehicle departure modes (S21). In this case, the recommended vehicle departure mode may be emphatically displayed or be displayed to have a greater size than the other vehicle departure modes.

The vehicle departure support device 40 may support the departure of the vehicle according to any one vehicle departure mode selected in the screen displayed through operation S18 or S21 described above (S23).

Accordingly, when the parking method is automatic parking and there is no movement of the vehicle in the parking space, the driver may quickly select the vehicle departure mode corresponding to the parking mode when parking by providing both the vehicle departure mode corresponding to the parking mode and the selection button capable of selecting another vehicle departure mode on one screen, and the driver may easily select a parking mode the driver wants among the other vehicle departure modes by selecting the selection button to provide the other vehicle departure mode even when the driver wants another vehicle departure mode. Further, when the driving method is automatic parking but there is movement of the vehicle in the parking space or the driving method is manual parking, the driver may be prevented from erroneously selecting the vehicle departure mode by displaying the recommended vehicle departure mode and differentiating it from the other vehicle departure modes on one screen based on information related to the distance to the obstacle around the vehicle while displaying all of the vehicle departure modes and considering that an environment when parking in the parking space has changed.

According to an embodiment of the present invention, when the departure of the vehicle is performed after parking of the vehicle is completed in the parking space, the driver can easily select a vehicle departure mode the driver wants by displaying all of the vehicle departure modes on the screen when there is movement of the vehicle in the parking space.

Further, according to an embodiment of the present invention, when the departure of the vehicle is performed after automatic parking is completed in the parking space and there is no movement of the vehicle in the parking space, the driver may easily select another vehicle departure mode as well as the vehicle departure mode corresponding to the parking mode by providing both the vehicle departure mode corresponding to the parking mode of a parking completion time stored in the storage and the selection button capable of selecting another parking mode so as to allow the driver to select another vehicle departure mode on one screen.

Moreover, according to an embodiment of the present invention, when the vehicle is parked in the parking space using manual parking and not automatic parking, the driver may be prevented from erroneously selecting the vehicle departure mode and also intuitively recognize the vehicle departure mode which the driver has to select by displaying all of the vehicle departure modes on the screen but displaying the vehicle departure mode recommended in the parking space by differentiating it from the other vehicle departure modes based on the distance to the obstacle positioned around the vehicle.

The above-described embodiments of the present invention are merely examples, and it should be apparent to those skilled in the art that various modifications can be made to the above-described embodiments of the present invention without departing from the spirit or the scope of the invention. The scope of the present invention is defined by the appended claims.

What is claimed is:

1. A vehicle departure support system for supporting departure of a vehicle parked in a parking space, comprising:
   a speed measurement unit, including one or more sensors, configured to measure a speed of the vehicle by using the sensors; and
   a vehicle departure support device, connected to an electronically controlled steering device for supporting steering in a vehicle departure direction, comprising:
      a storage unit configured to store a signal indicating whether an automatic parking switch of the vehicle is set to be ON or OFF at a time when the vehicle have been parked in the parking space, and the parking mode at a time at which parking is completed during automatic parking;
      a determination unit configured to compare the speed of the vehicle received from the speed measurement unit with a predetermined reference speed to thereby determine whether the vehicle moved in the parking space;

a vehicle departure mode determination unit configured to determine a vehicle departure mode for departing the vehicle out from the parking space, wherein the vehicle departure mode is determined in a manner of selecting a mode from among (i) a first mode for departing the vehicle in a backward perpendicular a direction, (ii) a second mode for departing the vehicle in a forward perpendicular direction, (iii) a third mode for departing the vehicle in a left parallel direction, and (iv) a forth mode for departing the vehicle in a right parallel, based on the determination result of the determination unit; and a vehicle departure mode display processor configured to display on the screen the vehicle departure mode determined by the vehicle departure mode determination unit.

2. The vehicle departure support system device of claim 1, wherein, when the determination unit determines that there is no movement of the vehicle in the parking space, the vehicle departure mode determination unit determines a vehicle departure mode corresponding to the parking mode stored in the storage unit as the vehicle departure mode capable of performing the departure of the vehicle in the parking space, and when the determination unit determines that there is a movement of the vehicle in the parking space, the vehicle departure mode determination unit determines a vehicle departure mode recommended among the first mode, the second mode, the third mode and the forth mode, based on a distance to an obstacle positioned around the vehicle.

3. The vehicle departure support system device of claim 1, wherein the determination unit determines whether a switch signal of the automatic parking switch stored in the storage unit is an ON signal or an OFF signal, and when the determination unit determines that the switch signal of the automatic parking switch is the OFF signal, the vehicle departure mode determination unit determines the vehicle departure mode recommended in the parking space based on a distance to an obstacle positioned around the vehicle among the first mode, the second mode, the third mode and the forth mode.

4. The vehicle departure support system device of claim 1, wherein the determination unit determines whether a switch signal of the automatic parking switch stored in the storage unit is the ON signal or the OFF signal, and when the determination unit determines that the switch signal of the automatic parking switch is the on signal and there is no movement of the vehicle when the departure of the vehicle is performed, the vehicle departure mode display processor displays both a vehicle departure mode corresponding to the parking mode stored in the storage unit and a selection button capable of selecting another vehicle departure mode on one screen.

5. The vehicle departure support system device of claim 1, wherein the determination unit determines whether a switch signal of the automatic parking switch stored in the storage unit is the ON signal or the OFF signal, and when the determination unit determines that the switch signal of the automatic parking switch is the ON signal and there is movement of the vehicle when the departure of the vehicle is performed, the vehicle departure mode display processor displays a vehicle departure mode recommended among the first mode, the second mode, the third mode and the forth mode by differentiating the recommended vehicle departure mode from the other vehicle departure modes on one screen when displaying the first mode, the second mode, the third mode and the forth mode on the one screen.

6. The vehicle departure support system device of claim 1, wherein the determination unit determines whether a switch signal of the automatic parking switch stored in the storage unit is the ON signal or the OFF signal, and when the determination unit determines that the switch signal of the automatic parking switch is the OFF signal, the vehicle departure mode display processor displays a vehicle departure mode recommended among the first mode, the second mode, the third mode and the forth mode by differentiating the recommended vehicle departure mode from the other vehicle departure modes on one screen when displaying the first mode, the second mode, the third mode and the forth mode on the one screen.

7. The vehicle departure support system device of claim 1, further comprising:

a distance measurement unit, including one or more sensors, installed in the vehicle, and configured to measure a distance to an obstacle positioned around the vehicle by using the sensors, wherein the vehicle departure mode determination unit determines a recommended vehicle departure mode using a vehicle departure type determined according to whether an obstacle is at a front and rear or a left and right of the vehicle based on the distance measured by the distance measurement unit and a parking direction determined according to whether an obstacle is in a direction which a vehicle departure of the vehicle using the determined vehicle departure type is performed.

8. A method performed by a vehicle departure support system device for supporting departure of a vehicle parked in a parking space, the method comprising:

determining that a signal indicating an ignition of the parked vehicle is on is received;

determining whether a parking method of the parked vehicle is an automatic parking method or a manual parking method when the signal is determined to be received; and determining a vehicle departure mode based on the parking method of the parked vehicle, wherein the vehicle departure mode indicates an operating mode for departing the parked vehicle out from the parking space, where the vehicle departure mode is determined in a manner of selecting a mode from among (i) a first mode for departing the parked vehicle in a backward perpendicular a direction, (ii) a second mode for departing the parked vehicle in a forward perpendicular direction, (iii) a third mode for departing the parked vehicle in a left parallel direction, and (iv) a forth mode for departing the parked vehicle in a right parallel.

9. The method of claim 8, further comprising, when the parking method of the parked vehicle is the automatic parking method, determining whether there is a movement of the vehicle.

10. The method of claim 9, wherein, when it is determined that there is no movement of the vehicle, the determining of the vehicle departure mode comprises:

determining a vehicle departure mode based on a parking mode at a time when parking the vehicle; and displaying both the determined vehicle departure mode and a selection button capable of selecting another vehicle departure mode on one screen.

11. The method of claim 9, wherein, when it is determined that there is a movement of the vehicle, the determining of the vehicle departure mode comprises:
   determining a vehicle departure mode recommended among the first mode, the second mode, the third mode and the forth mode based on a distance to an obstacle positioned around the parked vehicle.

12. The method of claim 8, wherein, when the parking method is the manual method at a time when parking the vehicle, the determining of the vehicle departure mode comprises:
   determining a vehicle departure mode recommended among the first mode, the second mode, the third mode and the forth mode based on a distance to an obstacle positioned around the vehicle;
   displaying the recommended vehicle departure mode by differentiating the recommended vehicle departure mode from the other vehicle departure modes on one screen to thereby support departing the parked vehicle from the parking space.

\* \* \* \* \*